(12) United States Patent
Li

(10) Patent No.: US 11,621,636 B2
(45) Date of Patent: Apr. 4, 2023

(54) SWITCHING CONVERTER WITH LOW QUIESCENT CURRENT AND CONTROL CIRCUIT THEREOF

(71) Applicant: Chengdu Monolithic Power Systems Co., Ltd., Chengdu (CN)

(72) Inventor: Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 51 days.

(21) Appl. No.: 17/385,543

(22) Filed: Jul. 26, 2021

(65) Prior Publication Data
US 2022/0045607 A1 Feb. 10, 2022

(30) Foreign Application Priority Data
Aug. 6, 2020 (CN) .......................... 202010786439.7

(51) Int. Cl.
*H02M 3/158* (2006.01)
*H02M 1/08* (2006.01)
*H02M 3/157* (2006.01)
*H02M 1/00* (2006.01)

(52) U.S. Cl.
CPC ......... *H02M 3/158* (2013.01); *H02M 1/0032* (2021.05); *H02M 1/083* (2013.01); *H02M 3/157* (2013.01)

(58) Field of Classification Search
CPC .... H02M 3/156; H02M 3/1566; H02M 3/158; H02M 1/0032
See application file for complete search history.

(56) References Cited

U.S. PATENT DOCUMENTS

| | | | | |
|---|---|---|---|---|
| 6,396,252 B1* | 5/2002 | Culpepper | ............ | H02M 3/156 323/284 |
| 2011/0115456 A1* | 5/2011 | Tanifuji | ................ | H02M 3/156 323/283 |
| 2013/0063102 A1* | 3/2013 | Chen | ...................... | H02M 3/156 323/234 |
| 2015/0042299 A1* | 2/2015 | Li | ....................... | H02M 3/1588 323/271 |
| 2016/0006340 A1* | 1/2016 | Xu | ........................ | H02M 3/156 323/271 |

OTHER PUBLICATIONS

U.S. Appl. No. 17/328,653, filed May 24, 2021, Lei Li.

* cited by examiner

*Primary Examiner* — Alex Torres-Rivera
(74) *Attorney, Agent, or Firm* — Perkins Coie LLP

(57) ABSTRACT

A control circuit for controlling a switching converter having a low quiescent current. The control circuit has an error amplifying circuit, an on time generator, a first comparing circuit and a second comparing circuit. When the switching converter operates in a light load operation mode, the error amplifying circuit and the on time generator are deactivated. Meanwhile, the first comparing circuit compares a current sensing signal indicative of inductor current with a current reference signal to provide an off time control signal during an on state of a low side switch to determine an on moment of a high side switch. The second comparing circuit compares the voltage feedback signal with a voltage reference signal to provide an on time control signal to determine an off moment of the high side switch.

17 Claims, 5 Drawing Sheets

SWITCHING CONVERTER WITH LOW QUIESCENT CURRENT AND CONTROL CIRCUIT THEREOF

CROSS-REFERENCE TO RELATED APPLICATION

This application claims the benefit of CN application No. 202010786439.7, filed on Aug. 6, 2020, and incorporated herein by reference.

TECHNICAL FIELD

The present invention generally refers to electrical circuit, and more particularly but not exclusively refers to switching converter with low quiescent current and associated control circuit.

BACKGROUND

In recent years, with continuous development of wireless sensor network, portable and wearable devices, smart-home devices and biomedical technologies etc., the collection and utilization of small power energy has attracted widespread attention, and switching converters used in these energy collection applications have a rapid development.

As a bridge connection between small power source and load, switching converters need to minimize the quiescent current of the switching converter itself to improve efficiency since the energy of the small power source is limited. For example, some energy collection applications, such as thermoelectric generators, solar panels etc., can only provide an output voltage with a few tens of millivolts to a switching converter. Therefore, in order to maintain a normal operation of the switching converter at such an ultra-low input voltage, low quiescent current of the switching converter is an indispensable requirement.

Therefore, it is desired to provide a control scheme for controlling the switching converter performing an excellent low quiescent current.

SUMMARY

Embodiments of the present invention are directed to a control circuit for controlling a switching converter comprising a high side switch and a low side switch. The control circuit comprises a first comparing circuit and a second comparing circuit. The first comparing circuit is configured to provide an off time control signal to determine an on moment of the high side switch. When the switching converter operates in a light load operation mode and the low side switch is on, the first comparing circuit is configured to receive a current sensing signal indicative of inductor current flowing through an inductor of the switching converter, and further configured to compare the current sensing signal with a current reference signal to provide the off time control signal. When the switching converter operates in the light load operation mode, the second comparing circuit is configured to be activated to receive a voltage feedback signal indicative of an output voltage signal of the switching converter, and further configured to compare the voltage feedback signal with a voltage reference signal to provide a first on time control signal to determine an off moment of the high side switch.

Embodiments of the present invention are directed to a control circuit for controlling a switching converter comprising a high side switch and a low side switch. The control circuit comprises an error amplifying circuit, an on time generator, a first comparing circuit, and a second comparing circuit. When the switching converter operates in a light load operation mode, the error amplifying circuit and the on time generator are deactivated. Meanwhile, the first comparing circuit is configured to be activated to receive a current sensing signal indicative of inductor current flowing through an inductor of the switching converter during an on state of the low side switch, and further configured to compare the current sensing signal with a current reference signal to provide the off time control signal. When the switching converter operates in the light load operation mode, the second comparing circuit is configured to be activated to receive a voltage feedback signal indicative of an output voltage signal of the switching converter, and further configured to compare the voltage feedback signal with a voltage reference signal to provide a first on time control signal to determine an off moment of the high side switch.

Embodiments of the present invention are directed to a switching converter comprising a high side switch and a low side switch, a first comparing circuit and a second comparing circuit. The first comparing circuit is configured to provide an off time control signal to determine an on moment of the high side switch. When the switching converter operates in a light load operation mode and the low side switch is on, the first comparing circuit is configured to receive a current sensing signal indicative of inductor current flowing through an inductor of the switching converter, and further configured to compare the current sensing signal with a current reference signal to provide the off time control signal. When the switching converter operates in the light load operation mode, the second comparing circuit is configured to be activated to receive a voltage feedback signal indicative of an output voltage signal of the switching converter, and further configured to compare the voltage feedback signal with a voltage reference signal to provide a first on time control signal to determine an off moment of the high side switch.

BRIEF DESCRIPTION OF THE DRAWINGS

Non-limiting and non-exhaustive embodiments are described with reference to the following drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" includes direct connection and indirect connection. Indirect connection includes connection through conductor which has resistance and/or parasitic parameters such as inductance and capacitance, or connection through diode, and so on.

Figure 1:
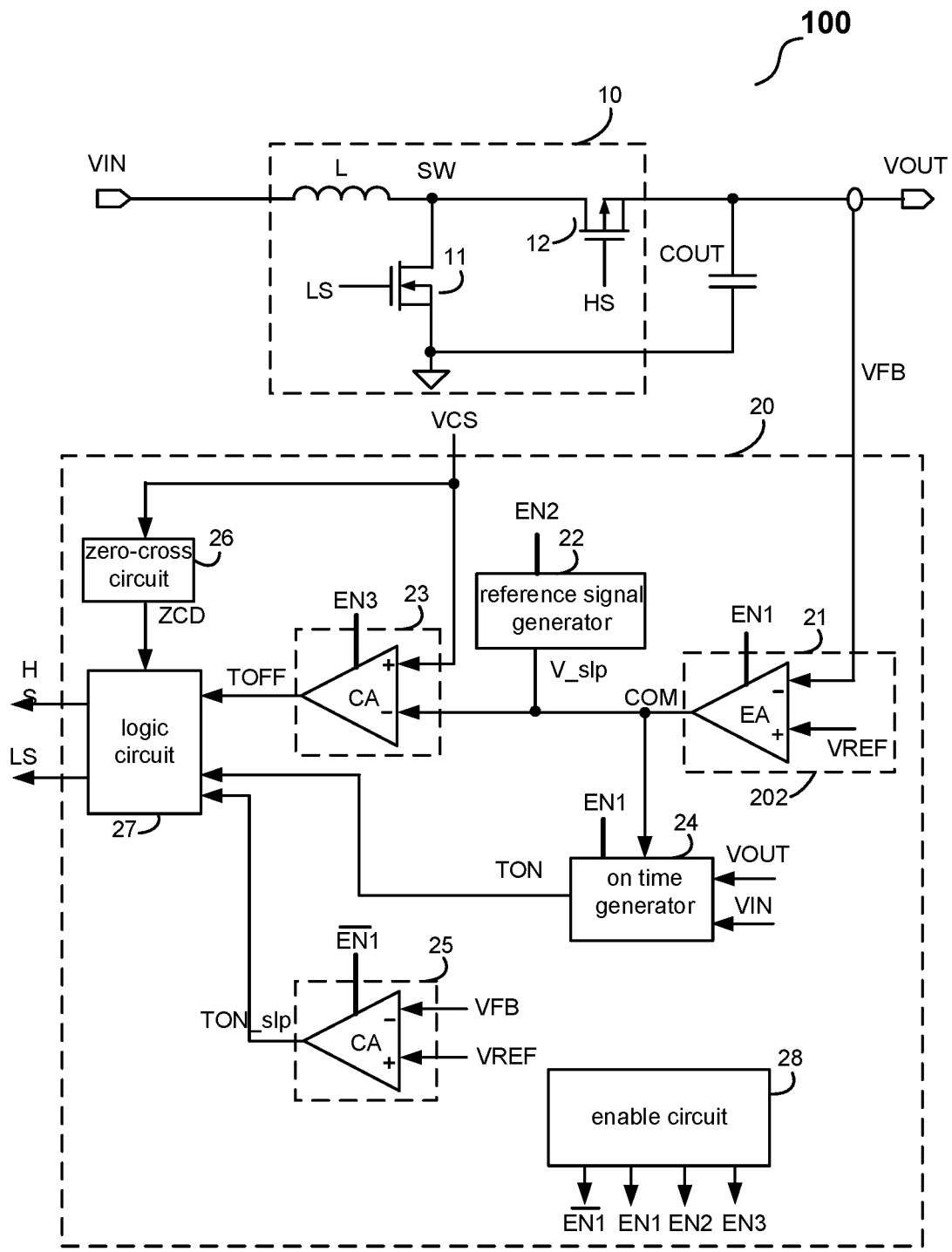
FIG. 1 illustrates a block diagram of a switching converter 100 in accordance with an embodiment of the present invention.

FIG. 1 illustrates a block diagram of a switching converter 100 in accordance with an embodiment of the present invention. As shown in FIG. 1, the switching converter 100 may comprise a switching circuit 10, an output capacitor COUT and a control circuit 20. In an embodiment, the switching circuit 10 may comprise an inductor L, a low side switch 11 and a high side switch 12. The switching converter 100 may be configured to convert an input voltage signal VIN to an output voltage signal VOUT through controlling the low side switch 11 and the high side switch 12 to perform on and off switching.

In an exemplary embodiment of FIG. 1, the inductor L, the low side switch 11 and the high side switch 12 are illustrated to have a BOOST topology. More specifically, each of the low side switch 11 and the high side switch 12 has a first terminal, a second terminal and a control terminal. The first terminal of the low side switch 11 and the first terminal of the high side switch 12 may be coupled together to constitute a common connection node SW. The second terminal of the low side switch 11 is connected to a logic ground. The second terminal of the high side switch 12 may be coupled to an output terminal of the switching converter 100. The inductor L may be coupled between an input terminal of the switching converter 100 and the common connection node SW. The output capacitor COUT may be connected between the output terminal of the switching converter 100 and the logic ground.

In the exemplary embodiment of FIG. 1, the low side switch 11 is illustrated as an N-type Metal Oxide Semiconductor Field Effect Transistor ("MOSFET"), and the high side switch 12 is illustrated as a P-type MOSFET. As can be appreciated, whereas the high side switch 12 and the low side switch 11 are illustrated as MOSFETs in FIG. 1, in other embodiments, the high side switch 12 and the low side switch 11 may comprise other suitable semiconductor devices such as Junction Field Effect Transistors ("JFETs"), Insulated Gate Bipolar Translators ("IGBTs"), Double Diffusion Metal Oxide Semiconductor ("DMOS") etc.

In the exemplary embodiment of FIG. 1, the control circuit 20 may comprise an error amplifying circuit 21, a reference signal generator 22, a first comparing circuit 23, an on time generator 24, a second comparing circuit 25, a zero-cross circuit 26 and a logic circuit 27. The switching converter 100 may comprise a normal operation mode and a light load operation mode. In an embodiment, the switching converter 100 with a light load may operate in the light load operation mode, and the switching converter 100 without a light load may operate in the normal operation mode.

One of ordinary skill in the art can understand that light load refers to the carrying capacity of switching converters. Generally, light load is defined relative to full load. For example, an application with a load rate less than 30% may be considered as a light load application. As can be appreciated, the load rate can be adjusted according to different applications. In an embodiment, output current of a switching converter below a light load current threshold may represent the switching converter enters into the light load operation mode. In the other embodiment, output voltage of the switching converter exceeding a light load voltage threshold may represent the switching converter enters light load operation mode.

In the exemplary embodiment of FIG. 1, when the switching converter 100 is configured to operate in the normal operation mode, the error amplifying circuit 21, the first comparing circuit 23 and the on time generator 24 are enabled while the reference signal generator 22 and the second comparing circuit 25 are disabled.

In the exemplary embodiment of FIG. 1, when the switching converter 100 is configured to operate in the light load operation mode, the error amplifying circuit 21 and the on time generator 24 are disabled while the second comparing circuit 25 is enabled for reducing the quiescent current. More importantly, during the light load operation mode, the reference signal generator 22 and the first comparing circuit 23 may be enabled only during the on state of the low side switch 11. That is to say, in the light load operation mode, the reference signal generator 22 and the first comparing circuit 23 may remain deactivated until the low side switch 11 is turned on, and will return to the deactivated state after the low side switch 11 is turned off, which may further reduce the quiescent current of the switching converter 100. It should be understood, no matter which mode the switching converter 100 is configured to operate in, the zero-cross circuit 26 and the logic circuit 27 are always enabled.

In the exemplary embodiment of FIG. 1, the control circuit 20 may further comprise an enable circuit 28 configured to generate a first enable signal EN1, an inversing signal of the first enable signal $\overline{EN1}$, a second enable signal EN2 and a third enable signal EN3. Herein, the first enable signal EN1 is configured to control the error amplifying circuit 21 and the on time generator 24 to perform enable and disable switching. The inversing signal of the first enable signal $\overline{EN1}$ is configured to control the second comparing circuit 25 to perform enable and disable switching. The second enable signal EN2 is configured to control the reference signal generator 22 to perform enable and disable switching. The third enable signal EN3 is configured to control the first comparing circuit 23 to perform enable and disable switching. In an embodiment, the enable circuit 28 may be configured to generate the first enable signal EN1, the inversing signal of the first enable signal $\overline{EN1}$, the second enable signal EN2 and the third enable signal EN3 based on a switch control signal, such as a high side control signal HS used to control the high side switch 12 on and off, or a low side control signal LS used to control the low side switch 11 on and off. In an embodiment, the first enable signal EN1, the inversing signal of the first enable signal $\overline{EN1}$, the second enable signal EN2 and the third enable signal EN3 may be logic signals with an active state (e.g., the logic high state) and an inactive state (e.g., the logic low state).

In an embodiment, the error amplifying circuit 21 may have an enable terminal configured to receive the first enable signal EN1, a first input terminal configured to receive a voltage feedback signal VFB indicative of the output voltage signal VOUT, a second terminal configured to receive a reference signal VREF, and an output terminal. When the first enable signal EN1 is in the active state (e.g., the logic high state), the error amplifying circuit 21 may be configured to amplify the difference of the voltage feedback signal VFB and the reference signal VREF to provide an error signal COM at its the output terminal. When the first enable signal EN1 is in the inactive state (e.g., the logic low state), the error amplifying circuit 21 may be disabled. In an embodiment, the first enable signal EN1 is in the active state when the switching converter 100 operates in the normal operation mode, and the first enable signal EN1 is in the inactive state when the switching converter 100 operates in the light load operation mode.

In an embodiment, the reference signal generator 22 may have an enable terminal configured to receive the second enable signal EN2. When the second enable signal EN2 is in the active state (e.g., the logic high state), the reference signal generator 22 may be configured to generate a current reference signal V_slp. When the second enable signal EN2 is in the inactive state (e.g., the logic low state), the reference signal generator 22 may be disabled. In an embodiment, the reference signal generator 22 may comprise a voltage source providing a voltage signal with constant value as the current reference signal V_slp. In an embodiment, the second enable signal EN2 is in the active state when the switching converter 100 operates in the light load operation mode and the low side switch 11 is on. Otherwise, the second enable signal EN2 is in the inactive state.

In an embodiment, the first comparing circuit 23 may have an enable terminal configured to receive the third enable signal EN3, a first input terminal configured to receive the error signal COM or the current reference signal V_slp, a second terminal configured to receive a current sensing signal VCS indicative of the inductor current signal flowing through the inductor L, and an output terminal. When the switching converter 100 is configured to operate in the normal operation mode, the first comparing circuit 23 is activated to compare the error signal COM with the current sensing signal VCS to provide an off time control signal TOFF at its output terminal once the third enable signal EN3 is in the active state. When the switching converter 100 is configured to operate in the light load operation mode, the first comparing circuit 23 is activated to compare the current reference signal V_slp with the current sensing signal VCS to provide the off time control signal TOFF at its output terminal once the third enable signal EN3 is in the active state. In an embodiment, the off time control signal TOFF may be logic signal with an active state (e.g., the logic high state) and an inactive state (e.g., the logic low state). In an embodiment, the off time control signal TOFF is configured to determine the on moment of the high side switch 12. In an embodiment, the third enable signal EN3 is in the inactive state when the switching converter 100 operates in the light load operation mode while the low side switch 11 is off. Otherwise, the third enable signal EN3 is in the active state. In the exemplary embodiment of FIG. 1, after the switching converter 100 enters into the light load operation mode, the logic state of the third enable signal EN3 is synchronously with the logic state of the second enable signal EN2.

In an embodiment, the on time generator 24 may be configured to receive the first enable signal EN1, the input voltage signal VIN and the output voltage signal VOUT. When the first enable signal EN1 is in the active state, the on time generator 24 may be configured to generate the on time control signal TON based on the input voltage signal VIN and the output voltage signal VOUT. When the first enable signal EN1 is in the inactive state, the on time generator 24 may be disabled. In an embodiment, the on time control signal TON is configured to determine the on duration of the high side switch 12 when the switching converter 100 operates in the normal operation mode. In other words, the on time control signal TON is configured to determine an off moment of the high side switch 12 when the switching converter 100 operates in the normal operation mode. In an embodiment, the off moment of the high side switch 12 is the moment when the high side switch 12 is turned off. For example, when the on time control signal TON is changed from the inactive state to the active state, the high side switch 12 is turned off. As can be appreciated, in the other embodiment, the on time control signal TON can also be configured to determine the on duration of the low side switch 11 when the switching converter 100 operates in the normal operation mode. In an exemplary embodiment, such as that shown in FIG. 1, the on time generator 24 may be further configured to receive the error signal COM, and generate the on time control signal TON based on the error signal COM, the input voltage signal VIN and the output voltage signal VOUT. In an embodiment, the smaller the error signal COM is, the longer on duration of the high side switch 12 is.

As can be appreciated, in other embodiments, such as a regular COT controlled scheme, the on time control signal TON may be irrelevant with the input voltage signal VIN, the output voltage signal VOUT and the error signal COM. The on time generator 201 may be configured to generate the on time control signal TON based on a default constant voltage signal, e.g., a power supply voltage signal VCC.

In an embodiment, the second comparing circuit 25 may have an enable terminal configured to receive the inversing signal of the first enable signal $\overline{EN1}$, a first input terminal configured to receive the voltage feedback signal VFB, a second terminal configured to receive the reference signal VREF, and an output terminal. When the inversing signal of the first enable signal $\overline{EN1}$ is in the active state (e.g., the logic high state), the second comparing circuit 25 is activated to compare the voltage feedback signal VFB with the reference signal VREF to provide an on time control signal TON_slp at its output terminal. When the inversing signal of the first enable signal $\overline{EN1}$ is in the inactive state (e.g., the logic low state), the second comparing circuit 25 is disabled. In an embodiment, the on time control signal TON_slp may be logic signal with an active state (e.g., the logic high state) and an inactive state (e.g., the logic low state). In an embodiment, the on time control signal TON_slp is configured to determine the off moment of the high side switch 12 when the switching converter 100 operates in the light load operation mode. In an embodiment, when the on time control signal TON_slp is changed from the inactive state to the active state, the high side switch 12 is turned off.

In an embodiment, the zero-cross circuit 26 may be configured to receive the current sensing signal VCS, and further configured to compare the current sensing signal VCS with a zero-crossing threshold to generate a zero-crossing signal ZCD to denote whether the inductor current signal is decreased to the zero-crossing threshold. In an embodiment, the zero-crossing signal ZCD may be logic signal with an active state (e.g., the logic high state) and an inactive state (e.g., the logic low state). In an embodiment, the active state of the zero-crossing signal ZCD denotes that the inductor current signal is decreased to the zero-crossing threshold. In an embodiment, the high side switch 12 is turned off once the zero-crossing signal ZCD is changed from the inactive state to the active state.

In an embodiment, the logic circuit 26 may be configured to generate the high side control signal HS and the low side control signal LS based on the off time control signal TOFF, the zero-crossing signal ZCD, the on time control signal TON, and the on time control signal TON_slp. In an embodiment, when the switching converter 100 operates in the normal operation mode, the logic circuit 26 may be configured to receive the off time control signal TOFF, the zero-crossing signal ZCD and the on time control signal TON, and further configured to conduct a logic operation of the off time control signal TOFF, the zero-crossing signal ZCD and the on time control signal TON to generate the high side control signal HS and the low side control signal LS. When the switching converter 100 is configured to operate in the light load operation mode, the logic circuit 26 may be may be configured to receive the off time control signal TOFF, the zero-crossing signal ZCD and the on time control signal TON_slp, and further configured to conduct a logic operation of the off time control signal TOFF, the zero-crossing signal ZCD and the on time control signal TON_slp to generate the high side control signal HS and the low side control signal LS. The high side control signal HS is configured to control the high side switch 12 to perform on and off switching. The low side control signal LS is configured to control the low side switch 11 to perform on and off switching. The high side control signal HS and the low side control signal LS may be logic signals having an active state (e.g., logic high) and an inactive state (e.g., logic low).

Figure 2:
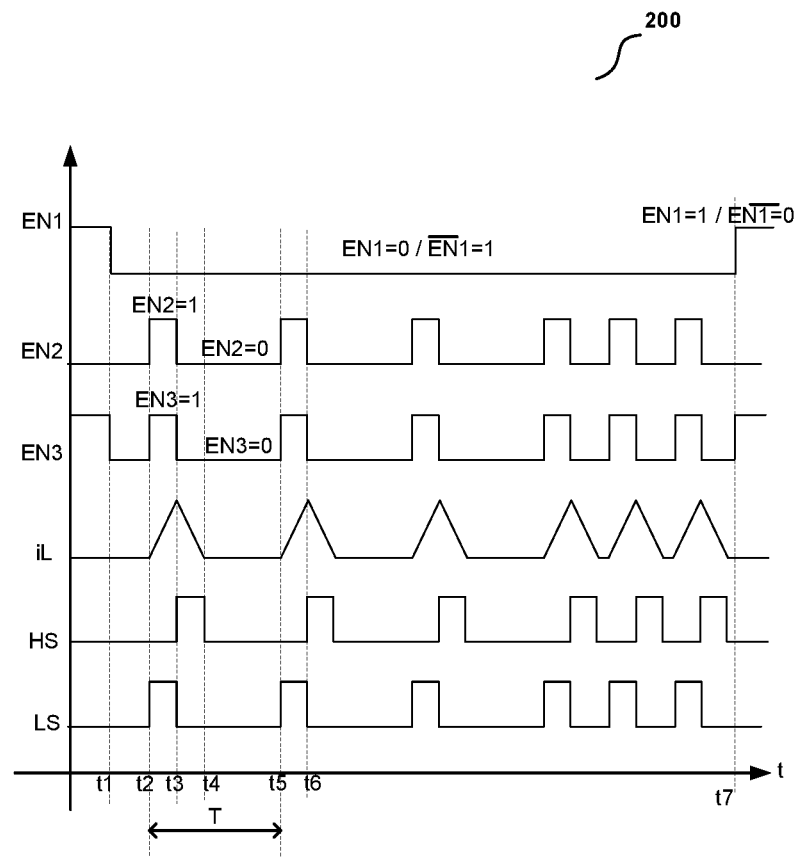
FIG. 2 illustrates an operation waveform diagram 200 for the switching converter 100 in accordance with an embodiment of the present invention.

FIG. 2 illustrates an operation waveform diagram 200 for the switching converter 100 in accordance with an embodiment of the present invention. As shown in FIG. 2, the diagram 200 illustrates the first enable signal EN1, the second enable signal EN2, the third enable signal EN3, an inductor current signal iL flowing through the inductor L, the high side control signal HS and the low side control signal LS from top-to-bottom. In the following pages, the waveform diagram 200 will be described with reference to FIG. 1. As shown in FIG. 2, before the moment t1, the switching converter 100 may operate in the normal operation mode so that the first enable signal EN1 and the third enable signal EN3 are in the active state while the second enable signal EN2 is in the inactive state. The error amplifying circuit 21, the first comparing circuit 23 and the on time generator 24 are enabled while the reference signal generator 22 and the second comparing circuit 25 are disabled.

At the moment t1, the switching converter 100 may enter into the light load operation mode so that the first enable signal EN1 and the third enable signal EN3 are changed from the active state to the inactive state while the second enable signal EN2 remains in the inactive state. The error amplifying circuit 21, the reference signal generator 22, the first comparing circuit 23 and the on time generator 24 are disabled while the second comparing circuit 25 is enabled.

At the moment t2, the low side control signal LS is changed from the inactive state to the active state so that the low side switch 11 is turned on. Meanwhile, the second enable signal EN2 and the third enable signal EN3 are changed from the inactive state to the active state to respectively activate the reference signal generator 22 and the first comparing circuit 23.

At the moment t3, the inductor current signal iL is increased to a maximum value. At this moment, the low side control signal LS is changed from the active state to the inactive state and the high side control signal HS is changed from the inactive state to the active state so that the low side switch 11 is turned off while the high side switch 12 is turned on. Meanwhile, the second enable signal EN2 and the third enable signal EN3 returns to the inactive state from the active state in consequence of deactivating the reference signal generator 22 and the first comparing circuit 23.

At the moment t4, the inductor current signal iL is decreased from the maximum value to the zero-crossing threshold (e.g., zero). The high side control signal HS is changed from the active state to the inactive state to turn the high side switch 12 off.

At the moment t5, one switching cycle is ending. From the moment t5 to the moment t6, the second enable signal EN2 and the third enable signal EN3 are changed from the inactive state to the active state again.

At the moment t7, the switching converter 100 may separate from the light load operation mode to the normal operation mode so that the first enable signal EN1 and the third enable signal EN3 returns to the active state while the second enable signal EN2 remains in the inactive state. The error amplifying circuit 21, the first comparing circuit 23 and the on time generator 24 are enabled while the reference signal generator 22 and the second comparing circuit 25 are disabled.

In accordance with the description with reference to FIGS. 1 and 2, the quiescent current could be minimized through deactivating the unnecessary modules in different operation modes.

Figure 3:
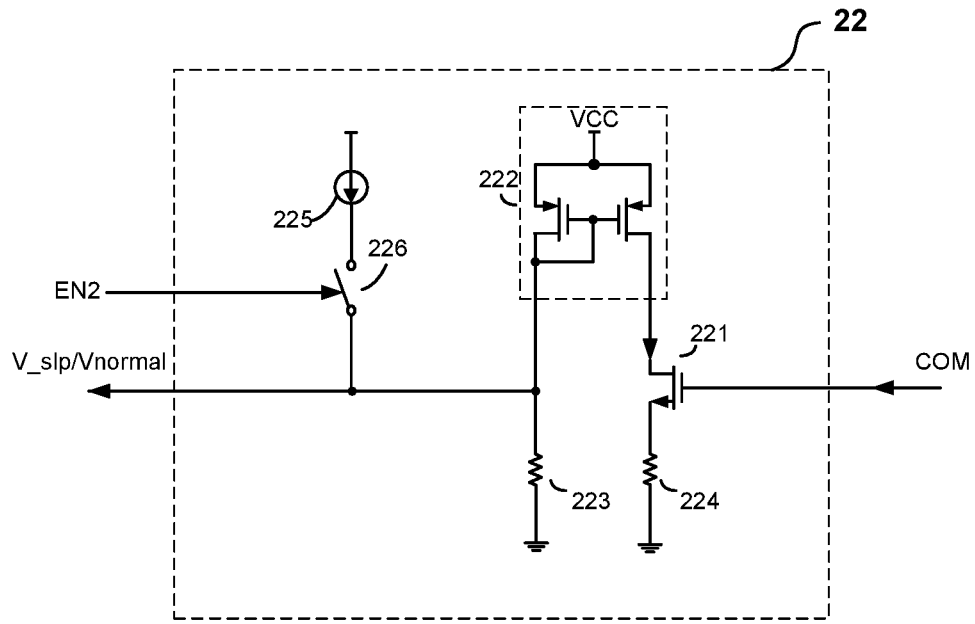
FIG. 3 schematically illustrates the reference signal generator 22 of FIG. 1 in accordance with an embodiment of the present invention.

FIG. 3 schematically illustrates the reference signal generator 22 of FIG. 1 in accordance with an embodiment of the present invention. As can be appreciated, the reference signal generator 22 of FIG. 3 is an exemplary embodiment of a reference signal generator that may be coupled between the output terminal of the error amplifying circuit 21 and the second terminal of the first comparing circuit 23. The reference signal generator 22 is configured to provide an error converting signal Vnormal indicative of the error signal COM or the current reference signal V_slp to the second terminal of the first comparing circuit 23. When the first enable signal EN1 is in the active state and the second enable signal EN2 is in the inactive state, the reference signal generator 22 is configured to receive the error signal COM to generate the error converting signal Vnormal. The first comparing circuit 23 may compare the error converting signal Vnormal with the current sensing signal VCS to provide the off time control signal TOFF once the third enable signal EN3 is in the active state. When the first enable signal EN1 is in the inactive state and the second enable signal EN2 is in the active state, the reference signal generator 22 is configured to provide the current reference signal V_slp. The first comparing circuit 23 may compare the current reference signal V_slp with the current sensing signal VCS to provide the off time control signal TOFF once the third enable signal EN3 is in the active state.

In the exemplary embodiment of FIG. 3, the reference signal generator 22 may comprise a transistor 221, a current mirror 222, a resistor 223, a resistor 224, a current source 225 and a switch 226. The transistor 221 may have a first terminal, a second terminal connected to the logic ground through the resistor 224, and a control terminal configured to receive the error signal COM. The current mirror 222 may have a first current terminal coupled to the first terminal of the transistor 221, a second current terminal connected to the logic ground through the resistor 223. The common connection of the second current terminal of the current mirror 222 and the resistor 223 is operated as an output terminal of the reference signal generator 22. The switch 226 may have a first terminal coupled to a current source, a second terminal coupled to the common connection of the second current terminal of the current mirror 222 and the resistor 223, and a control terminal configured to receive the second enable signal EN2. In an embodiment, when the second enable signal EN2 is in the inactive state, the switch 226 is off so that the error signal COM is converted to the error converting signal Vnormal through the transistor 221, the current mirror 222, the resistor 223 and the resistor 224. When the error amplifying circuit 21 is deactivated to generate the error signal COM and the second enable signal EN2 is in the active state, the switch 226 is turned on so as to couple the current source 225 to the logic ground through the switch 226 and the resistor 223. A voltage signal at the common connection of the switch 226 and the resistor 223 is operated as the current reference signal V_slp.

Figure 4:
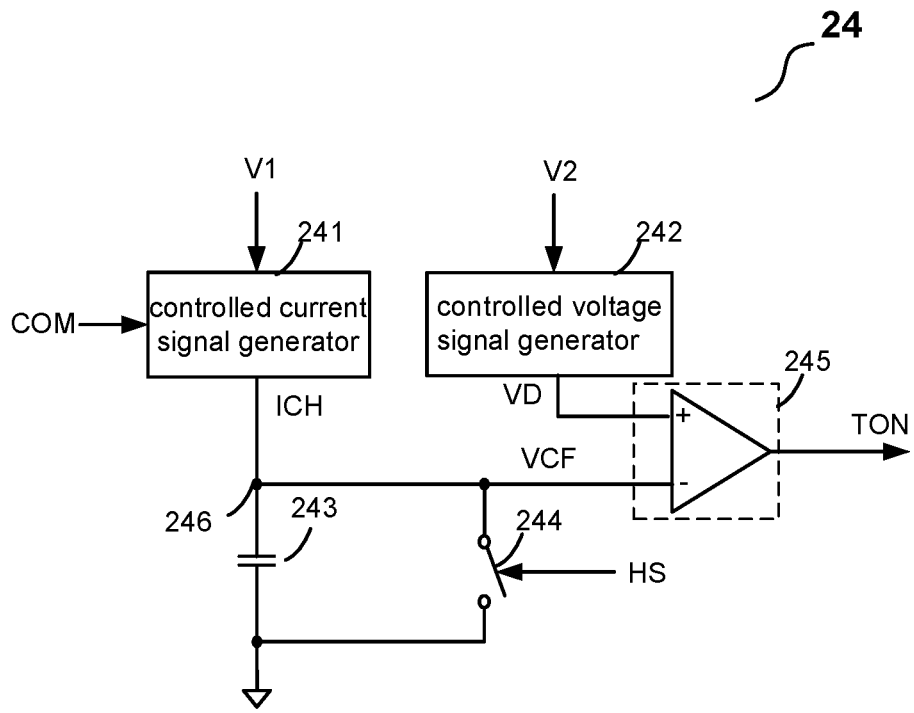
FIG. 4 schematically illustrates the on time generator 24 of FIG. 1 in accordance with an embodiment of the present invention.

FIG. 4 schematically illustrates the on time generator 24 of FIG. 1 in accordance with an embodiment of the present invention. In the exemplary embodiment of FIG. 4, the on time generator 24 may comprise a controlled current signal generator 241, a controlled voltage signal generator 242, a capacitor 243, a reset switch 244 and a comparator 245.

The controlled current signal generator 241 may be configured to receive a first voltage signal V1 and the error signal COM to generate a charging current signal ICH. The capacitor 243 may be connected between an output terminal of the controlled current signal generator 241 and the logic ground. The charging current signal ICH is configured to charge the capacitor 243 to generate a voltage signal VCF across the capacitor 243. The controlled voltage signal generator 242 may be configured to receive a second voltage signal V2 to generate a controlled voltage signal VD. The voltage comparator 245 may have a first input terminal configured to receive the controlled voltage signal VD, a second input terminal configured to receive the voltage signal VCF, and an output terminal. The comparator 245 may be configured to compare the controlled voltage signal VD with the voltage signal VCF to generate the on time control signal TON at its output terminal. The reset switch 244 may have a first input terminal coupled to the output terminal of the controlled current signal generator 241, a second input terminal connected to the logic ground, and a control terminal. In an embodiment, the control terminal of the reset switch 244 is controlled by the high side control signal HS. In such an application, when the high side control signal HS is in the active state (i.e., the high side switch 12 is turned on), the reset switch 244 is turned off so that the charging current signal ICH may begin to charge the capacitor 243. When the high side control signal HS is changed to the inactive state (i.e., the high side switch 12 is turned off), the reset switch 244 is turned on so that the capacitor 243 is discharged through the reset switch 244. As can be appreciated, whereas the error signal COM is provided to the controlled current signal generator 241 for generating the charging current signal ICH in the embodiment of FIG. 4, the error signal COM may also be provided to the controlled voltage signal generator 242 for generating the controlled voltage signal VD in other embodiments.

In the exemplary embodiment of FIG. 4, the first voltage signal V1 and the second voltage signal V2 may be chosen in compliance with topology of the switching circuit 10. For instance, as shown in FIG. 1, the switching circuit 10 is illustrated to have a BOOST topology and the on time control signal TON is used to determine the on duration of the high side switch 12. Therefore, the duty cycle of the high side switch 12 is proportional to the input voltage signal VIN, and inversely proportional to the output voltage signal VOUT. Therefore, the first voltage signal V1 may comprise the output voltage signal VOUT, and the second voltage signal V2 may comprise the input voltage signal VIN.

Figure 5:
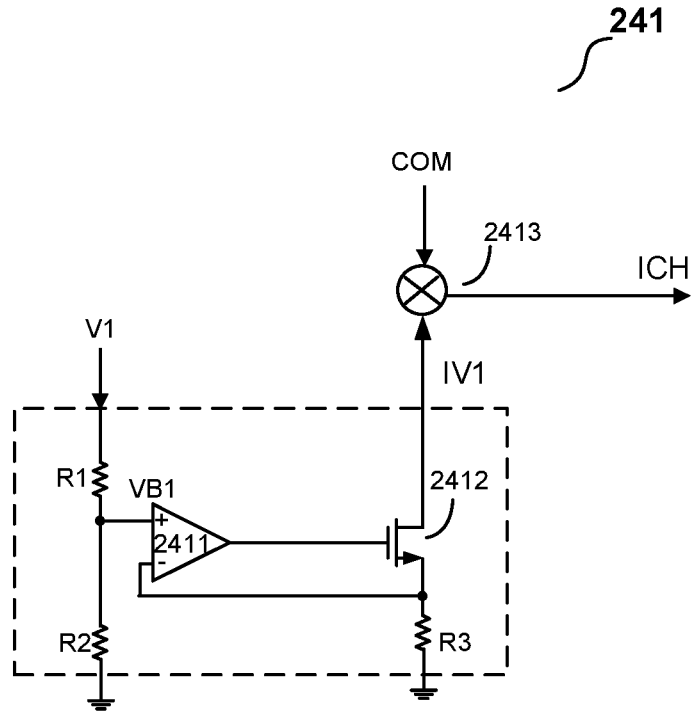
FIG. 5 schematically illustrates the controlled current signal generator 241 of FIG. 4 in accordance with an embodiment of the present invention.

FIG. 5 schematically illustrates the controlled current signal generator 241 of FIG. 4 in accordance with an embodiment of the present invention. In the exemplary embodiment of FIG. 5, the controlled current signal generator 241 may comprise an operational amplifier 2411, a transistor 2412, a resistance R1, a resistor R2, a resistor R3 and a multiplier 2413. The resistor R1 and the transistor R2 connected in series between an input terminal of the controllable current signal generator 241 and the logic ground so as to divide the first voltage signal V1 to generate a voltage signal VB1 at a common connection of the resistor R1 and the transistor R2. The operational amplifier 2411 may have a first input terminal configured to receive the voltage signal VB1, a second input terminal connected to the logic ground through the resistor R3, and an output terminal. The source of the transistor 2412 is connected to the logic ground through the resistor R3, the gate of the transistor 2412 is coupled to the output terminal of the operational amplifier 2411, and the drain of the transistor 2412 is configured to provide a current signal IV1. Herein, the current signal IV1 is proportional to the first voltage signal V1. The multiplier 2413 may be configured to receive the current signal IV1 and the error signal COM, and further configured to conduct a multiplication of the current signal IV1 and the error signal COM to generate the charging current signal ICH. Consequently, the charging current signal ICH can be varied in the current signal IV1 and the error signal COM.

Figure 6:
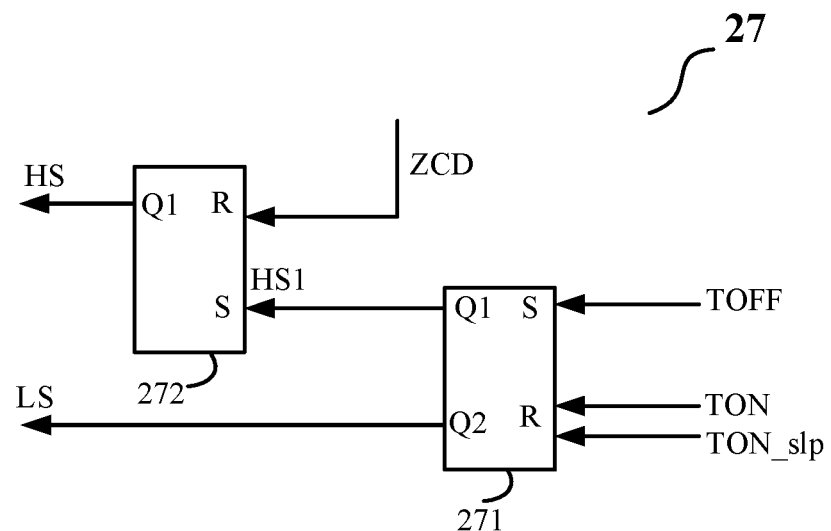
FIG. 6 schematically illustrates the logic circuit 27 of FIG. 1 in accordance with an embodiment of the present invention.

FIG. 6 schematically illustrates the logic circuit 27 of FIG. 1 in accordance with an embodiment of the present invention. In the exemplary embodiment of FIG. 6, the logic circuit 27 may comprise a first RS flip-flop 271 and a second RS flip-flop 272.

The first RS flip-flop 271 may comprise a set terminal S configured to receive the off time control signal TOFF, a reset terminal R configured to receive the on time control signal TON or the on time control signal TON_slp, a first output terminal Q1 configured to provide a first high side control signal HS1 and a second output terminal Q2 configured to provide the low side control signal LS. In an embodiment, when the off time control signal TOFF is in the active state, the first high side control signal HS1 is in an active state (e.g., the logic high state), and the low side control signal LS is in the inactive state. When the on time control signal TON or the on time control signal TON_slp is in the active state, and the first high side control signal HS1 is in an inactive state (e.g., the logic low state), and the low side control signal LS is in the active state.

The second RS flip-flop 272 may comprise a set terminal S configured to receive the first high side control signal HS1, a reset terminal R configured to receive the zero-crossing signal ZCD, a first output terminal Q1 configured to provide the high side control signal HS. In an embodiment, when the first high side control signal HS1 is in the active state, the high side control signal HS is in the active state. When zero-crossing signal ZCD is in the active state, the high side control signal HS is in the inactive state.

Figure 7:
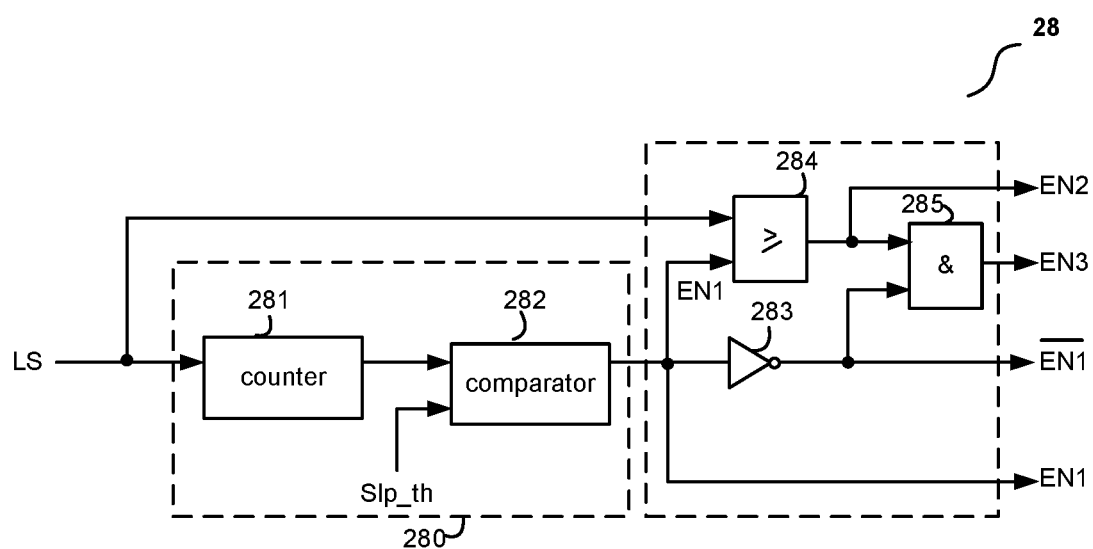
FIG. 7 schematically illustrates the enable circuit 28 of FIG. 1 in accordance with an embodiment of the present invention.

FIG. 7 schematically illustrates the enable circuit 28 of FIG. 1 in accordance with an embodiment of the present invention. In the exemplary embodiment of FIG. 7, the enable circuit 28 may comprise a light load determining circuit 280 and an enable logic circuit. The light load determining circuit 280 is configured to generate the first enable signal EN1 to determine whether a switching converter is operated in a light load operation mode. The enable logic circuit configured to receive the low side control signal LS and the first enable signal EN1 to generate the inversing signal of the first enable signal $\overline{EN1}$, the second enable signal EN2 and the third enable signal EN3.

In an embodiment, there may have many ways to determine whether a switching converter is operated in a light load operation mode, for example, determining whether the error signal COM is lower than the light load threshold, or determining whether the low side switch 11 and the high side switch 12 are turned off repeatedly in a certain period, etc. In the exemplary embodiment of FIG. 7, the light load determining circuit 280 may be illustrated to comprise a counter 281 and a comparator 282. The counter 281 is configured to receive the low side control signal LS, and further configured to count quantity of active states of the low side control signal LS in a predetermined period to generate a counting signal, i.e, count on times of the low side switch 11. The comparator 282 is configured to receive the counting signal, and further configured to compare the counting signal with a light load counting threshold Slp_th to generate the first enable signal EN1. In an embodiment, when the counting signal is lower than the light load counting threshold Slp_th, the first enable signal EN1 is in the inactive state which indicates that the switching converter 100 operates in the light load operation mode. Otherwise, the first enable signal EN1 is in the active state that indicates that the switching converter 100 operates in the normal operation mode.

In an embodiment, the enable logic circuit may comprise an inverter 283, an OR logic gate 284 and an AND logic gate 285. The inverter 283 is configured to receive the first enable signal EN1 to generate the inversing signal of the first enable signal $\overline{EN1}$. The OR logic gate 284 is configured to receive the first enable signal EN1 and the low side control signal LS, and further configured to conduct a logic OR operation of the first enable signal EN1 and the low side control signal LS to generate the second enable signal EN2. The AND logic gate 285 is configured to receive the inversing signal of the first enable signal $\overline{EN1}$ and the second enable signal EN2, and further configured to conduct a logic AND operation of the inversing signal of the first enable signal $\overline{EN1}$ and the second enable signal EN2 to generate the third enable signal EN3.

Figure 8:
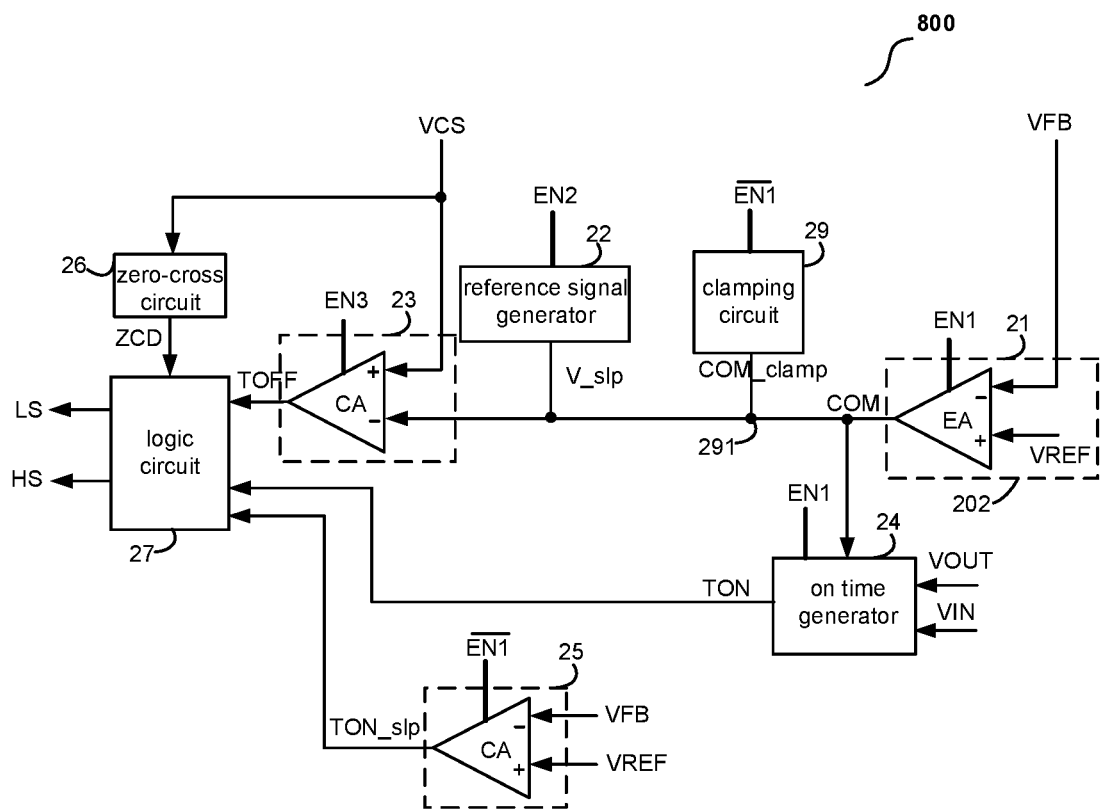
FIG. 8 illustrates a block diagram of a switching converter 800 in accordance with an embodiment of the present invention.

FIG. 8 illustrates a block diagram of a switching converter 800 in accordance with an embodiment of the present invention. Comparing with the switching converter 100 of FIG. 1, the switching converter 800 may further comprise a clamping circuit 29. The clamping circuit 29 coupled to the output terminal 291 of the error amplifying circuit 21 may comprise an enable terminal configured to receive the inversing signal of the first enable signal $\overline{EN1}$. The clamping circuit 29 may be configured to clamp the value of the error signal COM to generate a clamping signal COM_clamp at the moment when the inversing signal of the first enable signal $\overline{EN1}$ is changed from the inactive state (e.g., the logic low state) to the active state (e.g., the logic high state), and further configured to provide the clamping signal COM_clamp to an output terminal of the error amplifying circuit 21 at the moment when the error amplifying circuit 21 returns to the enabled state. In such an application, when the inversing signal of the first enable signal $\overline{EN1}$ returns to the inactive state, i.e., the error amplifying circuit 21 is enabled again, the error signal COM may be rapidly recovered to a value of the clamping signal COM_clamp. The dynamic response of the switching converter 800 is improved. Besides the clamping circuit 29, the other modules of the switching converter 800 same as those of the switching converter 100 will not be described again for a purpose of simplicity.

Figure 9:
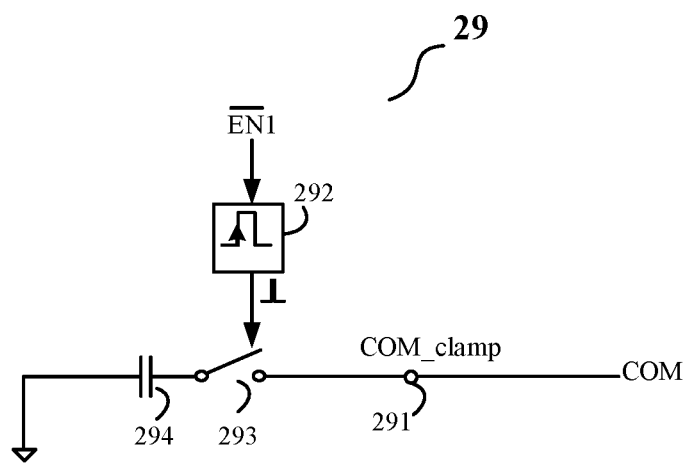
FIG. 9 schematically illustrates the clamping circuit 29 of FIG. 8 in accordance with an embodiment of the present invention.

FIG. 9 schematically illustrates the clamping circuit 29 of FIG. 8 in accordance with an embodiment of the present invention. As shown in FIG. 9, the clamping circuit 29 may comprise a pulse generator 292, a switch 293 and a capacitor 294. In the exemplary embodiment of FIG. 9, the pulse generator 292 may be configured to receive the inversing signal of the first enable signal $\overline{EN1}$, and further configured to generate a pulse at the rising edge and a pulse at the falling edge of the inversing signal of the first enable signal $\overline{EN1}$. In other embodiments, the pulse generator 292 may also be configured to receive the first enable signal EN1, and further configured to generate a pulse at the falling edge and a pulse at the rising edge of the first enable signal EN1. The switch 293 may comprise a first terminal coupled to the output terminal 291 of the error amplifying circuit 21 to receive the error signal COM, a second terminal connected to the logic ground through the capacitor 294, and a control terminal configured to receive the pulse signal generated by the pulse generator 292.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What I claim is:

1. A control circuit for controlling a switching converter, wherein the switching converter having a high side switch and a low side switch, the control circuit comprising:
a first comparing circuit, configured to provide an off time control signal, wherein the off time control signal is configured to determine an on moment of the high side switch, and wherein when the switching converter operates in a light load operation mode and the low side switch is on, the first comparing circuit is configured to receive a current sensing signal indicative of inductor current flowing through an inductor of the switching converter, and further configured to compare the current sensing signal with a current reference signal to provide the off time control signal;
a second comparing circuit, wherein when the switching converter operates in the light load operation mode, the second comparing circuit is configured to be activated to receive a voltage feedback signal indicative of an output voltage signal of the switching converter, and further configured to compare the voltage feedback signal with a voltage reference signal to provide a first on time control signal, and wherein the first on time control signal is configured to determine an off moment of the high side switch;

an error amplifying circuit, wherein when the switching converter operates in a normal operation mode, the error amplifying circuit is configured to be activated to receive the voltage feedback signal and the voltage reference signal, and further configured to amplify the difference of the voltage feedback signal and the voltage reference signal to provide an error signal; and an on time generator, wherein when the switching converter operates in the normal operation mode, the on time generator is configured to be activated to generate a second on time control signal based on an input voltage signal of the switching converter and the output voltage signal, and wherein the second on time control signal is configured to determine the off moment of the high side switch; and wherein when the switching converter operates in the normal operation mode, the first comparing circuit is configured to compare the current sensing signal with the error signal to provide the off time control signal.

2. The control circuit of claim 1, wherein when the switching converter operates in the normal operation mode, the second comparing circuit is configured to be deactivated.

3. The control circuit of claim 1, further comprising:
a zero-cross circuit, configured to receive the current sensing signal, and further configured to compare the current sensing signal with a zero-crossing threshold to generate a zero-crossing signal, wherein when the current sensing signal decreases to the zero-crossing threshold, the zero-crossing signal is configured to turn the high side switch off.

4. The control circuit of claim 3, further comprising:
a logic circuit, configured to receive the first on time control signal, the second on time control signal, the off time control signal and the zero-crossing signal, and further configured to conduct a logic operation of the first on time control signal, the second on time control signal, the off time control signal and the zero-crossing signal to generate a high side control signal configured to control the high side switch on and off, and a low side control signal configured to control the low side switch on and off.

5. The control circuit of claim 4, wherein
when the switching converter operates in the light load operation mode, the logic circuit is configured to conduct a logic operation of the first on time control signal, the off time control signal and the zero-crossing signal to generate the high side control signal and the low side control signal; and wherein
when the switching converter operates in the normal operation mode, the logic circuit is configured to conduct a logic operation of the second on time control signal, the off time control signal and the zero-crossing signal to generate the high side control signal and the low side control signal.

6. The control circuit of claim 4, wherein the control circuit further comprises an enable circuit, and wherein the enable circuit comprises:
a light load determining circuit, configured to receive the low side control signal to generate a first enable signal, wherein the first enable signal is configured to control the error amplifying circuit and the on time generator to perform enable and disable switching; and
an enable logic circuit, configured to receive the low side control signal and the first enable signal to generate an inversing signal of the first enable signal and a second enable signal, wherein the inversing signal of the first enable signal is configured to control the second comparing circuit to perform enable and disable switching, and wherein the second enable signal is configured to control the first comparing circuit to perform enable and disable switching.

7. The control circuit of claim 1, further comprising:
a clamping circuit, configured to clamp the value of the error signal to generate a clamping signal at the moment when the error amplifying circuit is changed from an enabled state to a disabled state, and further configured to provide the clamping signal to an output terminal of the error amplifying circuit at the moment when the error amplifying circuit returns to the enabled state.

8. The control circuit of claim 1, wherein the on time generator is further configured to receive the error signal, and configured to generate the second on time control signal based on an input voltage signal, the output voltage signal and the error signal.

9. The control circuit of claim 8, wherein the smaller the error signal is, the longer on duration of the high side switch is.

10. The control circuit of claim 1, further comprising a reference signal generator configured to generate the current reference signal.

11. The control circuit of claim 10, wherein the reference signal generator comprises:
a transistor, having a first terminal, a second terminal connected to a logic ground through a first resistor, and a control terminal configured to receive the error signal;
a current mirror, having a first current terminal coupled to the first terminal of the transistor, a second current terminal connected to the logic ground through a second resistor; and
a current source, coupled to a common connection of the second current terminal of the current mirror and the second resistor through a current switch; wherein
when the switching converter operates in the light load operation mode and the low side switch is on, the current switch is turned on, and wherein a voltage across the common connection of the second current terminal of the current mirror and the second resistor is the current reference signal; and wherein
when the switching converter operates in the normal operation mode, the current switch is turned off, and wherein the voltage across the common connection of the second current terminal of the current mirror and the second resistor is indicative of the error signal.

12. A control circuit for controlling a switching converter, wherein the switching converter having a high side switch and a low side switch, the control circuit comprising:
an error amplifying circuit;
an on time generator;
a first comparing circuit; and
a second comparing circuit; wherein
when the switching converter operates in a light load operation mode, the error amplifying circuit and the on time generator are deactivated; and wherein
when the switching converter operates in the light load operation mode, the first comparing circuit is configured to be activated to receive a current sensing signal indicative of inductor current flowing through an inductor of the switching converter during an on state of the low side switch, and further configured to compare the current sensing signal with a current reference signal to provide an off time control signal, wherein the off time control signal is configured to determine an on moment of the high side switch; and wherein when the switching converter operates in the light load operation mode, the second comparing circuit is configured to be activated to receive a voltage feedback signal indicative of an output voltage signal of the switching converter, and further configured to compare the voltage feedback signal with a voltage reference signal to provide a first on time control signal, wherein the first on time control signal is configured to determine an off moment of the high side switch.

13. The control circuit of claim 12, wherein when the switching converter operates in a normal operation mode:
the second comparing circuit is configured to be deactivated;
the error amplifying circuit is configured to be activated to receive the voltage feedback signal and the voltage reference signal, and further configured to amplify the difference of the voltage feedback signal and the voltage reference signal to provide an error signal;
the on time generator is configured to be activated to generate a second on time control signal based on an input voltage signal of the switching converter and the output voltage signal, and wherein the second on time control signal is configured to determine the off moment of the high side switch; and
the first comparing circuit is configured to compare the current sensing signal with the error signal to provide the off time control signal.

14. The control circuit of claim 13, further comprising:
a clamping circuit, configured to clamp the value of the error signal to generate a clamping signal at the moment when the error amplifying circuit is changed from an enabled state to a disabled state, and further configured to provide the clamping signal to an output terminal of the error amplifying circuit at the moment when the error amplifying circuit returns to the enabled state.

15. A switching converter, comprising:
a high side switch and a low side switch;
a first comparing circuit, configured to provide an off time control signal, wherein the off time control signal is configured to determine an on moment of the high side switch, and wherein when the switching converter operates in a light load operation mode and the low side switch is on, the first comparing circuit is configured to receive a current sensing signal indicative of inductor current flowing through an inductor of the switching converter, and further configured to compare the current sensing signal with a current reference signal to provide the off time control signal;
a second comparing circuit, wherein when the switching converter operates in the light load operation mode, the second comparing circuit is configured to be activated to receive a voltage feedback signal indicative of an output voltage signal of the switching converter, and further configured to compare the voltage feedback signal with a voltage reference signal to provide a first on time control signal, and wherein the first on time control signal is configured to determine an off moment of the high side switch;
an error amplifying circuit, wherein when the switching converter operates in a normal operation mode, the error amplifying circuit is configured to be activated to receive the voltage feedback signal and the voltage reference signal, and further configured to amplify the difference of the voltage feedback signal and the voltage reference signal to provide an error signal; and
an on time generator, wherein when the switching converter operates in the normal operation mode, the on time generator is configured to be activated to generate a second on time control signal based on an input voltage signal of the switching converter and the output voltage signal, and wherein the second on time control signal is configured to determine the off moment of the high side switch; and wherein
when the switching converter operates in the normal operation mode, the first comparing circuit is configured to compare the current sensing signal with the error signal to provide the off time control signal.

16. The switching converter of claim 15, wherein when the switching converter operates in the normal operation mode, the second comparing circuit is configured to be deactivated.

17. The switching converter of claim 15, further comprising:
a clamping circuit, configured to clamp the value of the error signal to generate a clamping signal at the moment when the error amplifying circuit is changed from an enabled state to a disabled state, and further configured to provide the clamping signal to an output terminal of the error amplifying circuit at the moment when the error amplifying circuit returns to the enabled state.

* * * * *